United States Patent
Gullickson et al.

(10) Patent No.: US 9,617,465 B2
(45) Date of Patent: Apr. 11, 2017

(54) LEAKOFF MITIGATION TREATMENT UTILIZING SELF DEGRADING MATERIALS PRIOR TO RE-FRACTURE TREATMENT

(71) Applicant: Halliburton Energy Services, Inc., Houston, TX (US)

(72) Inventors: Geoffrey W. Gullickson, Denver, CO (US); William Owen Alexander Ruhle, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/593,665

(22) Filed: Jan. 9, 2015

(65) Prior Publication Data

US 2016/0201442 A1   Jul. 14, 2016

(51) Int. Cl.
| | |
|---|---|
| *E21B 43/267* | (2006.01) |
| *E21B 43/04* | (2006.01) |
| *C09K 8/80* | (2006.01) |
| *E21B 43/26* | (2006.01) |
| *C09K 8/516* | (2006.01) |
| *C09K 8/92* | (2006.01) |

(52) U.S. Cl.
CPC ............... *C09K 8/80* (2013.01); *C09K 8/516* (2013.01); *C09K 8/92* (2013.01); *E21B 43/261* (2013.01); *E21B 43/267* (2013.01); *E21B 43/04* (2013.01)

(58) Field of Classification Search
CPC ........ E21B 43/267; E21B 43/04; E21B 43/26; E21B 43/261; E21B 33/134; E21B 33/138; C09K 8/80; C09K 8/516; C09K 2208/18; C09K 8/805
See application file for complete search history.

(56) References Cited

U.S. PATENT DOCUMENTS

2015/0144347 A1* 5/2015 Brannon .............. E21B 43/261
                                                   166/308.1

OTHER PUBLICATIONS

"Losseal W/O Engineered Fiber Treatment for Lost Circulation", www.schlumberger.com/losseal, (2013), 1 pg.
"Weatherford BioBlock-10 Self-Degradable Diverting Agent", www.weatherford.com, (Jun. 2013), 1 pg.
"Weatherford BioBlock-7 Self-Degradable Diverting Agent", www.weatherford.com, (Jun. 2013), 1 pg.
Bell, C.E. et al., "Effective Diverting on Horizontal Wells in the Austin Chalk", Presentation at the 68th Annual Technical Conference and Exhibition of the Society of Petroleum Engineers held in Houston, TX, Oct. 3-6, 1993, 725-738, SPE 26582, Society of Petroleum Engineers, Inc., C.E. Bell, BJ Services; B.W. Holmes, Union Pacific Resources Co.; and A.R. Rickards, BJ Services, 14 pgs.

(Continued)

*Primary Examiner* — Zakiya W Bates
(74) *Attorney, Agent, or Firm* — Iselin Law PLLC; Craig Roddy

(57) ABSTRACT

A method of treating a subterranean formation includes combining self-degrading particles with a carrier fluid, placing the self-degrading particles and the carrier fluid into a zone in a formation, said zone comprising fractures, allowing the self-degrading materials to penetrate and plug off the connection to existing fractures and to bridge off fracture propagation near the wellbore, and initiating a re-fracture treatment comprising re-fracture fluids and proppant materials prior to the degradation of the self-degrading particles.

27 Claims, 8 Drawing Sheets

(56) References Cited

OTHER PUBLICATIONS

R., L J., et al., "Large-Volume, High-Rate Stimulation Treatments in Horizontal Wells in the Niobrara Formation, Silo Field, Laramie County, Wyoming", Presented at the SPE Rocky Mountain Regional/Low Permeability Reservoirs Symposium held in Denver, CO, Apr. 12-14, 1993, 781-794, SPE 25926, Society of Petroleum Engineers, 14 pgs.

Vincent, M.C. "Refracs—Why Do They Work, and Why Do They Fail in 100 Published Field Studies?", Presentation at the SPE Annual Technical Conference and Exhibition held in Florence, Italy, Sep. 19-22, 2010, p. 1-45, SPE 134330, Society of Petroleum Engineers, 45 pgs.

\* cited by examiner

LEAKOFF MITIGATION TREATMENT UTILIZING SELF DEGRADING MATERIALS PRIOR TO RE-FRACTURE TREATMENT

BACKGROUND

The present invention generally relates to the use of self degrading materials in subterranean operations, and, more specifically, to the use of self degrading materials prior to re-fracture treatments in subterranean operations.

Many petroleum-containing formations require some form of stimulation treatment to economically produce hydrocarbons. Stimulation treatments can be performed upon completion of the well construction or later in the life of the well after producing hydrocarbons. As production drains the reservoir, secondary stimulation treatments can also be used to enhance the production rate of a well.

Oil or gas residing in the subterranean formation may be recovered by stimulation treatments, which fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

The completion of a horizontal well is often designed to have mechanical barriers along the wellbore for isolation of multistage fracture treatments. These mechanical barriers included tubular, cement, packers, plugs and ball and baffle devices. With isolation along, outside and inside the tubular the primary fracture treatments are completed in sequence from toe to heel to create multiple stages (compartments) along the wellbore. Each consecutive stage is initiated by creating new entry points through the tubular, either by perforations or mechanically activated ports which provide access to the reservoir whilst maintaining isolation up hole. FIGS. 1 & 2 are common completion designs used for multistage fracturing. In the case of an cemented liner with perforation clusters 100, the intermediate casing 101 surrounds the production liner 102. The lateral portion includes a heel 103 and a toe 106. The cement liner 104 contains perforations 105. In the case of an uncemented liner with isolation packers and perforation clusters 200, the intermediate casing 201 surrounds the production liner 202. The lateral portion includes a heel 203 and a toe 207. The liner 204 contains perforations 205 and isolation packers 206. Other completion methods that do not use mechanical barriers to create compartments are open hole completions with or without a liner (tubular). As seen in FIG. 3, an open hole with a perforated liner 300 includes intermediate casing 301 that surrounds the production liner 302. The lateral portion includes a heel 303 and a toe 305. The liner 304 is perforated. As illustrated in FIG. 4, an open hole design 400 includes intermediate casing 401. The lateral portion includes a heel 402 and a toe 403.

Once the primary stimulation treatment is complete, the well is ready to produce fluids. As reservoir fluids are produced from the wellbore the reservoir pressure will decline due to the volumetric drainage within the pore space of the reservoir. Re-fracture treatments (secondary hydraulic fracture treatment) are a common method of enhancing the production of a mature well. A significant difference in primary and secondary fracture treatments is the ability to isolate compartments of the wellbore for stimulation. The entry points created during the primary fracture treatment are a permanent destruction of the wellbore isolation, therefore multistage re-fracturing from toe to heel is not possible without installing new barriers. Installing new barriers is difficult to economically achieve with current technology. Re-fracture treatments often utilize massive fluid volumes at high injections rates in order to create diversion across the large contact area of the reservoir. Self-degrading materials have also been pumped between or during re-fracture treatments to create diversion by bridging off flow into the hydraulic fracture. The successes of these methods has been limited.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
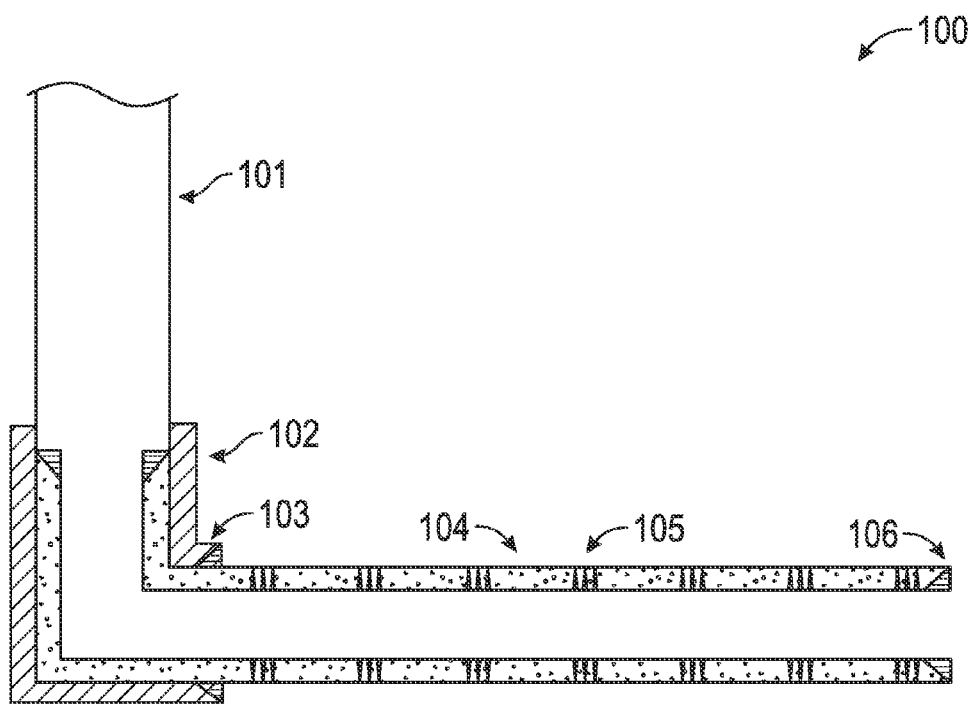
FIG. 1 depicts a completion design for multistage fracturing according to the prior art.
Figure 2:
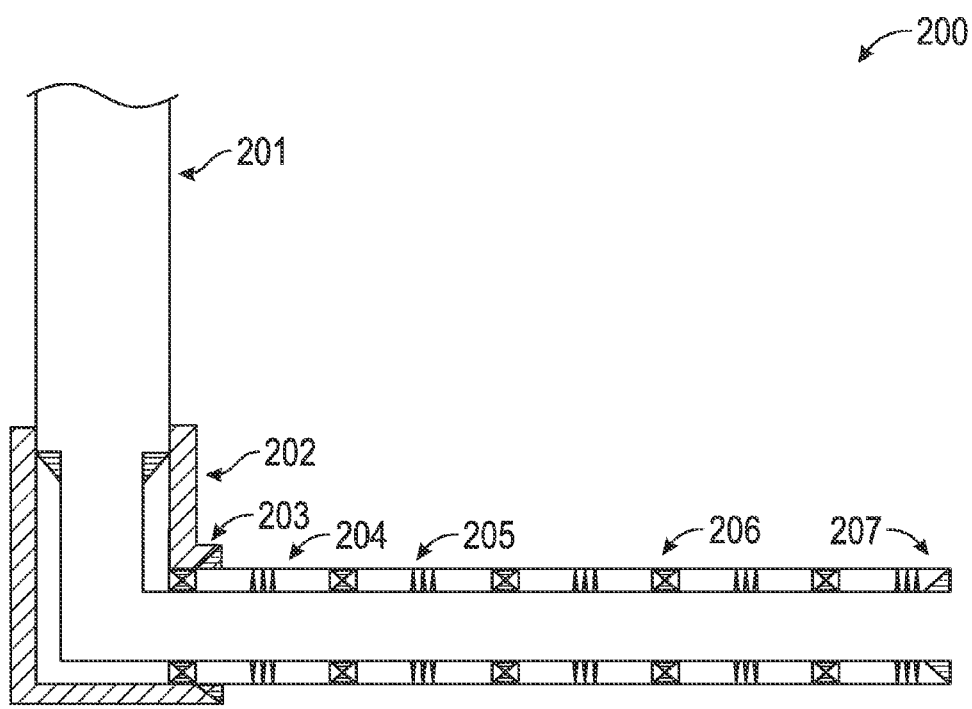
FIG. 2 depicts a completion design for multistage fracturing according to the prior art.
Figure 3:
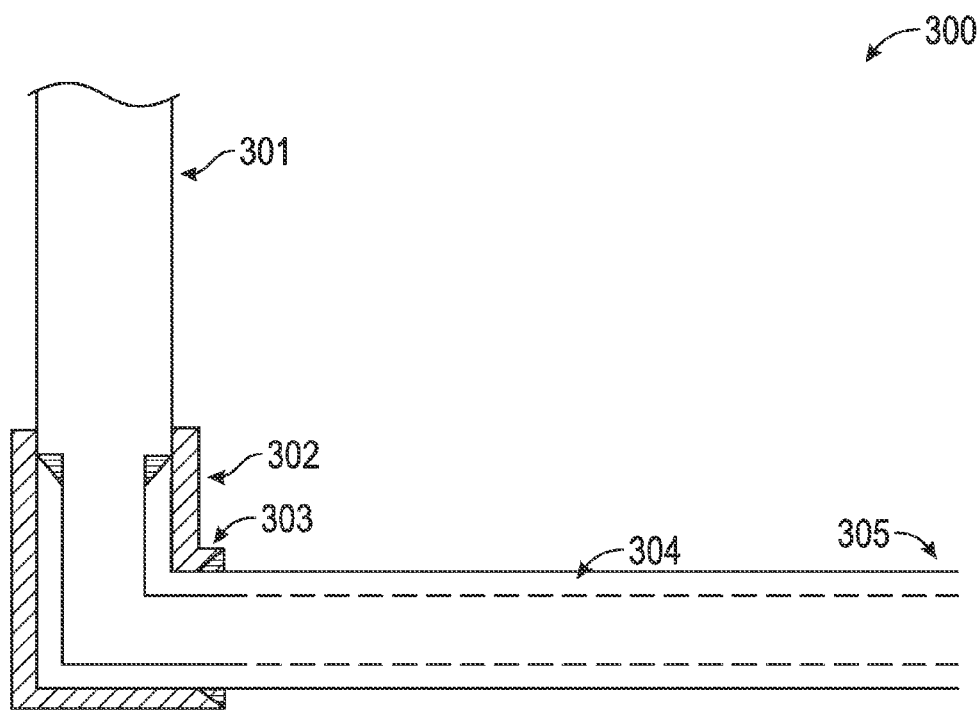
FIG. 3 depicts an open hole completion design with a liner according to the prior art.
Figure 4:
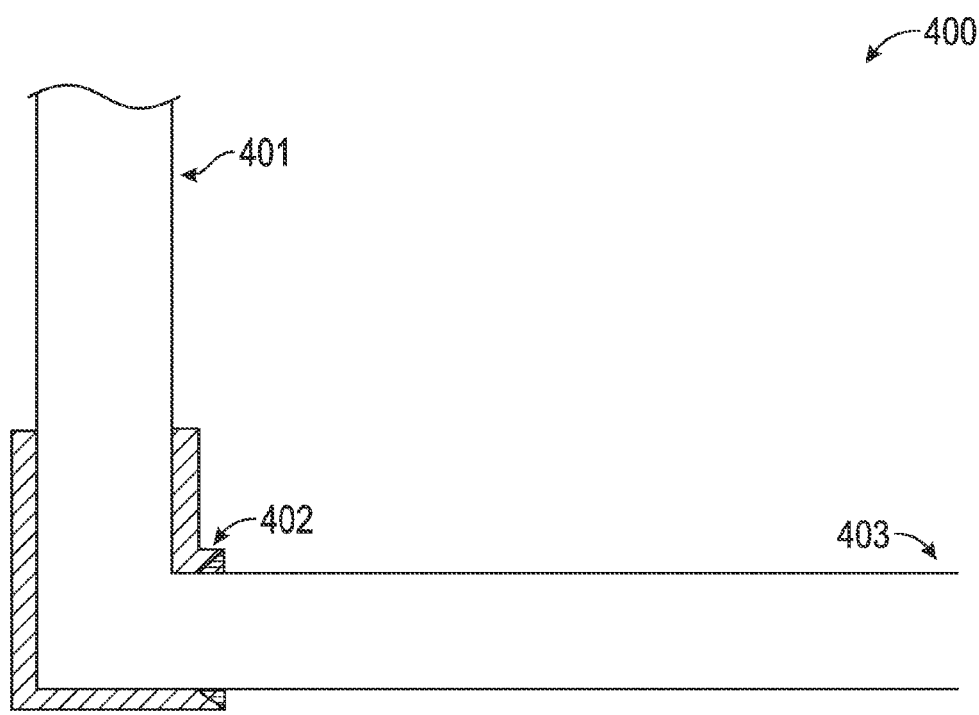
FIG. 4 depicts an open hole completion design without a liner according to the prior art.

Illustrative embodiments of this disclosure describe a method of treating a wellbore in a subterranean formation comprising: combining self-degrading particles with a carrier fluid; placing the self-degrading particles and the carrier fluid into a fracture in the subterranean formation; allowing the self-degrading materials to penetrate and plug off the connection to existing fractures and to bridge off fracture propagation near the wellbore; and initiating a re-fracture treatment comprising re-fracture fluids and proppant materials prior to the degradation of the self-degrading particles. In some embodiments, at least about 10% of the diameters of the self-degrading particles are smaller than the proppant material diameter, and at least about 10% of the diameters of the self-degrading particles are larger than the proppant material diameter. In another embodiment, the particle diameters of the self-degrading material may have a distribution where about 10% to about 20% are smaller than the proppant material diameter and about 10% to about 20% are larger than the proppant material diameter. In a further embodiment, the particle diameters of the self-degrading material may have a distribution where about 10% to about 20% are smaller than the proppant material diameter and about 10% to about 20% are larger than the proppant material diameter. The portion of self-degrading particles smaller than the proppant material may penetrate and may plug off the connection to existing fractures. The portion of self-degrading particles larger than the proppant material may bridge off fracture propagation near the wellbore. In some embodiments, self-degrading particles may be placed into the reservoir at a lower injection rate than the average fracture or re-fracture treatment rate. In exemplary embodiments, the wellbore may comprise a lateral portion with a heel and a toe, and the self-degrading particles in the carrier fluid may control the leakoff of re-fracturing fluids into natural and existing propped fractures in the heel of the well. The carrier fluid may consist of at least one of an aqueous based fluid; non-aqueous based fluid; commingled foam using nitrogen, commingled foam using carbon dioxide; a binary combination of multiple energized fluids, and combinations thereof. The self-degrading particles may be at least one selected from phenyl formaldehyde; lactone styrene derivatives; precipitated silica; elastomers; polyvinylidene chloride (PVDC); nylon; waxes; polyurethanes; cross-linked partially hydrolyzed acrylics; poly(hydroxy alkanoate) (PHA); poly(alpha-hydroxy) acids; polylactic acid (PLA), polygylcolic acid (PGA), polylactide, polyglycolide; poly(beta-hydroxy alkanoates); poly(beta-hydroxy butyrate) (PHB); poly(beta-hydroxybutyrates-co-beta-hydroxyvelerate) (PHBV); poly(omega-hydroxy alkanoates); poly(beta-propiolactone) (PPL); poly(ε-caprolactone) (PCL); poly(alkylene dicarboxylates); poly(ethylene succinate) (PES); poly(butylene succinate) (PBS); poly(butylene succinate-co-butylene adipate); polyanhydrides; poly(adipic anhydride); poly(orthoesters); polycarbonates; poly(trimethylene carbonate); poly(dioxepan-2-one)]; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); polyphosphazenes, and combinations thereof. In some embodiments, excessive leakoff into the existing fracture network may occur due to the localized depletion of pore pressure in the reservoir, and the leakoff may be mitigated by creating diversion away from localized depletion of pore pressure by utilizing the self-degrading materials. In some embodiments, the invasion of re-fracturing fluids into preexisting fractures may be minimized, and the regained flow capacity of existing fractures may be improved. In certain embodiments, the carrier fluid comprises a foam. In some embodiments, the subterranean formation includes a shale formation.

In an embodiment, a method of re-fracturing a wellbore is disclosed, comprising: placing self-degrading particles and a carrier fluid into the wellbore, wherein the wellbore is in a fractured formation; allowing the self-degrading materials to penetrate and plug off the connection to existing fractures in the formation and to bridge off fracture propagation near the wellbore; and initiating a re-fracture treatment comprising re-fracture fluids and proppant materials prior to the degradation of the self-degrading particles. In some embodiments, at least about 10% of the diameters of the self-degrading particles are smaller than the proppant material diameter, and at least about 10% of the diameters of the self-degrading particles are larger than the proppant material diameter. The portion of self-degrading particles smaller than the proppant material may penetrate and may plug off the connection to existing fractures. The portion of self-degrading particles larger than the proppant material may bridge off fracture propagation near the wellbore. In some embodiments, self-degrading particles may be placed into the reservoir at a lower injection rate than the average fracture or re-fracture treatment rate. In exemplary embodiments, the wellbore may comprise a lateral portion with a heel and a toe, and the self-degrading particles in the carrier fluid may control the leakoff of re-fracturing fluids into natural and existing propped fractures in the heel of the well. The carrier fluid may consist of at least one of an aqueous based fluid; non-aqueous based fluid; commingled foam using nitrogen, commingled foam using carbon dioxide; a binary combination of multiple energized fluids, and combinations thereof. The self-degrading particles may be at least one selected from phenyl formaldehyde; lactone styrene derivatives; precipitated silica; elastomers; polyvinylidene chloride (PVDC); nylon; waxes; polyurethanes; cross-linked partially hydrolyzed acrylics; poly(hydroxy alkanoate) (PHA); poly(alpha-hydroxy) acids; polylactic acid (PLA), polygylcolic acid (PGA), polylactide, polyglycolide; poly(beta-hydroxy alkanoates); poly(beta-hydroxy butyrate) (PHB); poly(beta-hydroxybutyrates-co-beta-hydroxyvelerate) (PHBV); poly(omega-hydroxy alkanoates); poly(beta-propiolactone) (PPL); poly(ε-caprolactone) (PCL); poly(alkylene dicarboxylates); poly(ethylene succinate) (PES); poly(butylene succinate) (PBS); poly(butylene succinate-co-butylene adipate); polyanhydrides; poly(adipic anhydride); poly(orthoesters); polycarbonates; poly(trimethylene carbonate); poly(dioxepan-2-one)]; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); polyphosphazenes, and combinations thereof. In some embodiments, excessive leakoff into the existing fracture network may occur due to the localized depletion of pore pressure in the reservoir, and the leakoff may be mitigated by creating diversion away from localized depletion of pore pressure by utilizing the self-degrading materials. In some embodiments, the invasion of re-fracturing fluids into preexisting fractures may be minimized, and the regained flow capacity of existing fractures may be improved.

In another embodiment, a method of mitigating leakoff during re-fracturing a wellbore, comprises: placing self-degrading particles and a carrier fluid into the wellbore, wherein the wellbore is in a fractured formation; allowing the self-degrading materials to penetrate and plug off the connection to existing fractures in the formation and to bridge off fracture propagation near the wellbore; and initiating a re-fracture treatment comprising re-fracture fluids and proppant materials prior to the degradation of the self-degrading particles. In some embodiments, at least about 10% of the diameters of the self-degrading particles are smaller than the proppant material diameter, and at least about 10% of the diameters of the self-degrading particles are larger than the proppant material diameter. The portion of self-degrading particles smaller than the proppant material may penetrate and may plug off the connection to existing fractures and the portion of self-degrading particles larger than the proppant material may bridge off fracture propagation near the wellbore.

In yet another embodiment, a well treatment system comprises: a wellbore treatment apparatus, including a mixer and a pump, configured to: combine self-degrading particles with a carrier fluid; place the self-degrading particles and the carrier fluid into a fracture in a subterranean formation; allow the self-degrading materials to penetrate and plug off the connection to existing fractures and to bridge off fracture propagation near the wellbore; and initiate a re-fracture treatment comprising re-fracture fluids and proppant materials prior to the degradation of the self-degrading particles.

Figure 5:
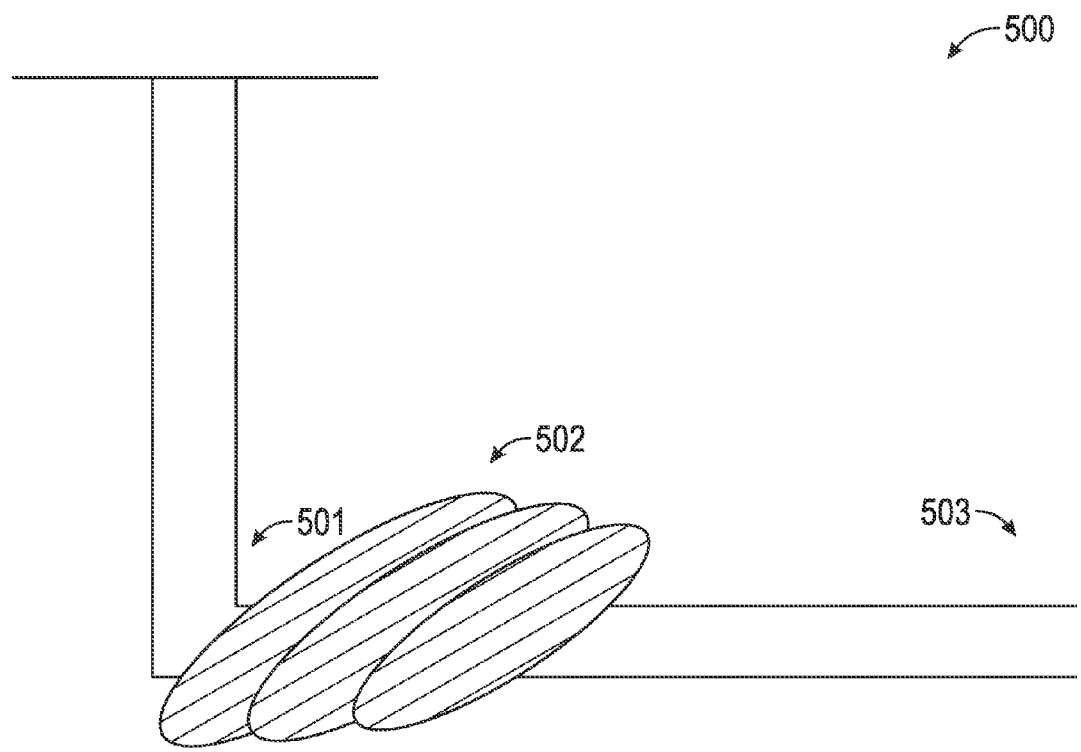
FIG. 5 illustrates fracture growth concentrated around the heal due to leakoff.

Without being tied to a specific theory, it is believed that the majority of fluid enters the reservoir near the heel of the lateral, typically attributed to the large contact area for leakoff of fracturing fluids into the depleted reservoir. FIG. 5 illustrates that theory of where a majority of fluid enters a reservoir 500. Fracture growth 502 being concentrated around the heel 501 instead of the toe 503 due to excessive leakoff of fracturing fluids.

Figure 6:
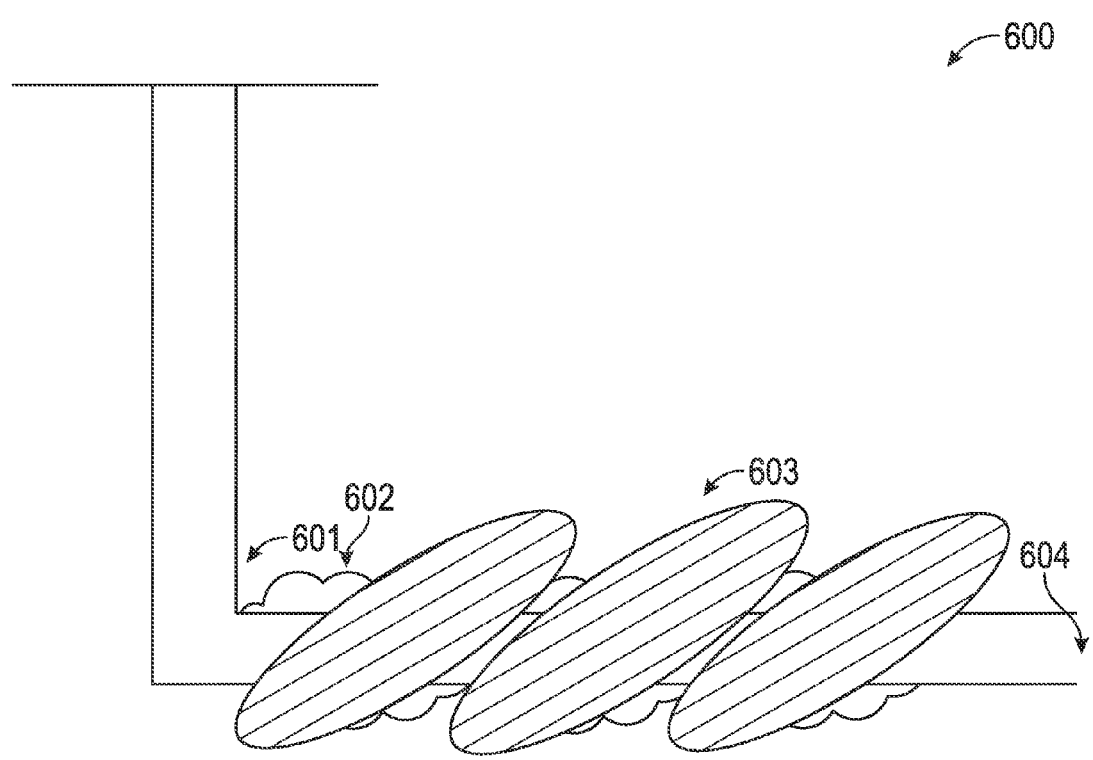
FIG. 6 illustrates fracture growth after self-degrading materials are displaced into the reservoir prior to fracture treatment.

As discussed previously, excessive leakoff into the existing fracture network occurs due to the localized depletion of pore pressure in the reservoir. Certain embodiments of this disclosure mitigate leakoff by creating diversion away from localized pressure depletions with self-degrading materials. This may reduce the fluid volumes required to fill the depleted voids. The materials may be injected into formation at a low rate prior to the main proppant schedule. The particle diameters of these materials may be designed to penetrate the flow channels within the rock matrix and fractures (naturals and existing propped fractures). FIG. 6 illustrates a re-fracture treatment after injecting self-degrading materials into the reservoir to mitigate leakoff 600. Near the heel 601, shallow penetration of self-degrading materials 602 to bridge off connection of existing fractures occurs. The initiation of new fractures 603 distributed along the wellbore towards the toe 604 may be due to effective diversion. The self-degrading materials are displaced into the reservoir voids prior to the main fracture treatment and may mitigate leakoff during the fracture treatment.

Figure 7:
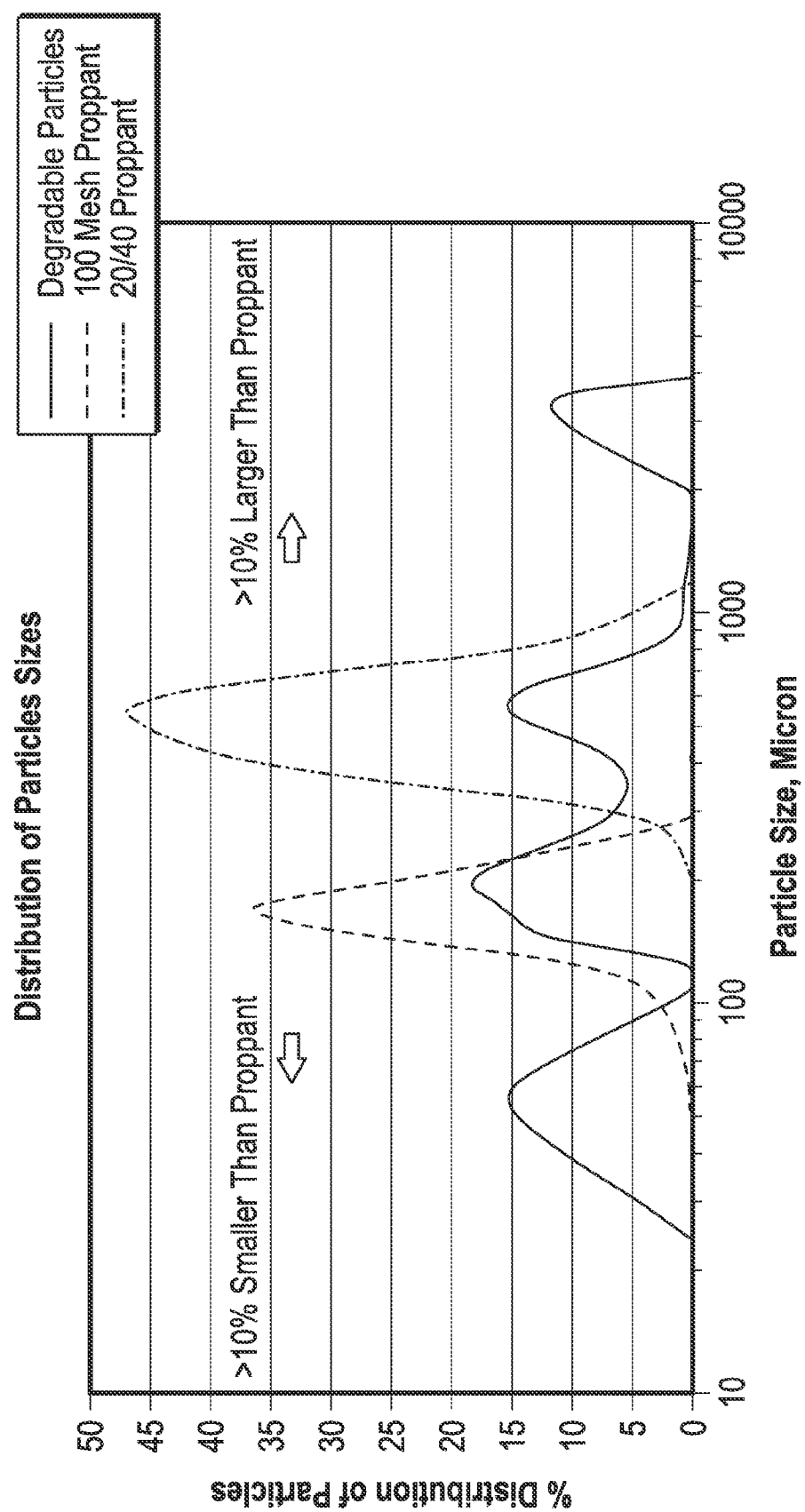
FIG. 7 illustrates a sample distribution of the self-degrading particle sizes.
Figure 8:
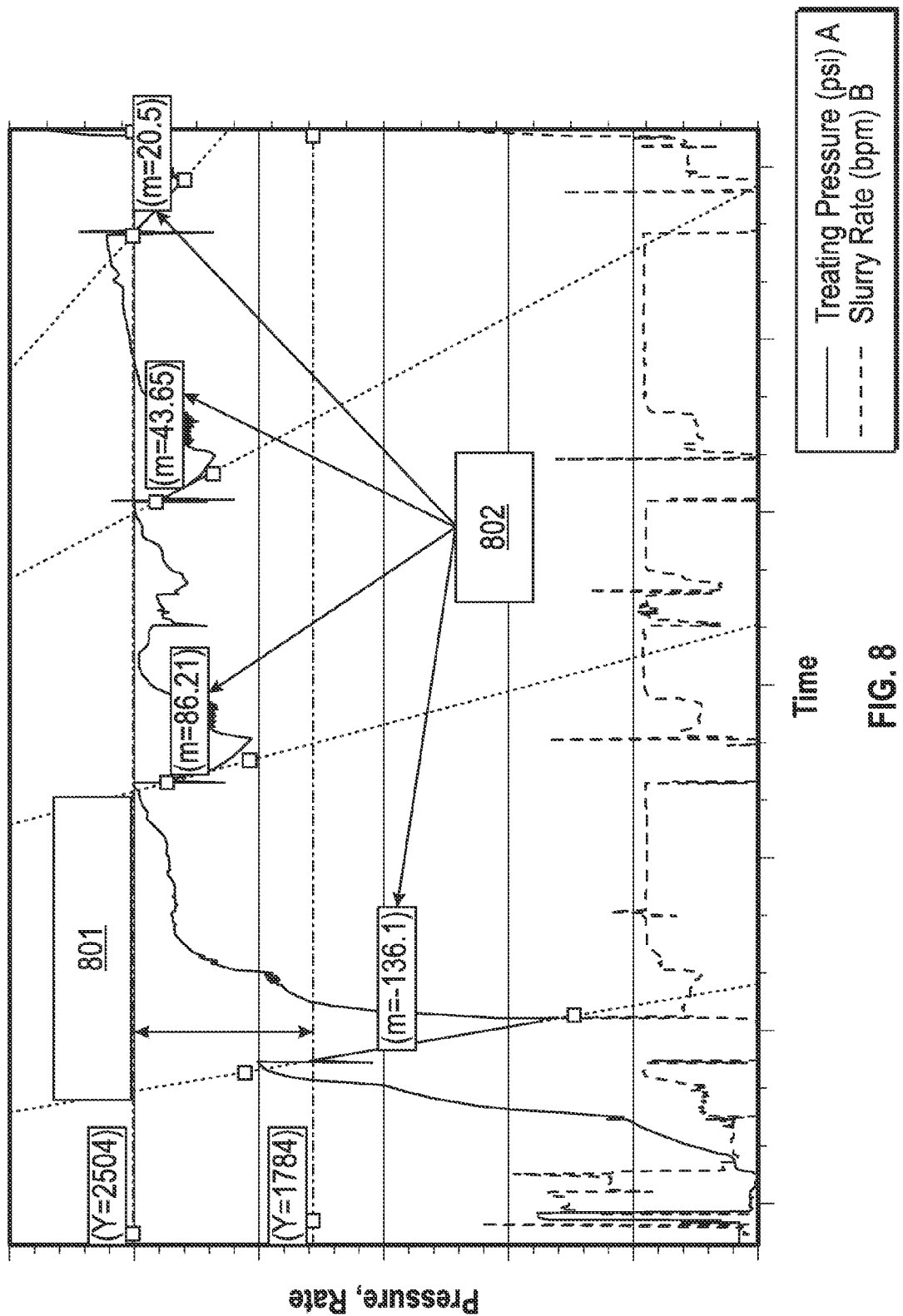
FIG. 8 illustrates the pressure and slurry rate over time after the injection of self-degrading materials to mitigate leakoff in a depleted reservoir.

Some embodiments of the invention divert fracturing fluid away from existing fractures by injecting fluid carrying self-degrading particles prior to the main proppant schedule of the treatment. The particle diameters of the self-degrading material have a distribution where greater than 10% are smaller than the proppant diameter and greater than 10% are larger than the proppant diameter. FIG. 7 provides an illustration of the distribution of particles sizes for the typical proppants and the self-degrading materials according to some embodiments of the invention. The distribution is designed so that the portion of particles smaller than the proppant may penetrate and plug off the connection to existing fractures, while the portion of particles larger than the proppant may bridge off fracture propagation near the wellbore. The diverting material may be displaced into the reservoir at a low injection rate. The injection rate may be lower than the average fracture treatment rate, thus minimizing dilation of existing fracture networks. FIG. 8 illustrates the results after a sufficient quantity of self-degrading particles have been pumped into the reservoir to prevent leakoff into the depleted pressure zones. Note the increase in instantaneous shut-in pressure 801, and the decrease in zero rate leakoff slope after each leakoff mitigation treatment has traversed the lateral 802.

The particles sizes used in the present disclosure have a wide distribution of diameters. A portion of the particles may be smaller than the proppant in order to penetrate and plug off the pore throat of existing fracture or pore spaces. Another portion of particles may be larger than the proppant in order to bridge off induced fracture propagation near the wellbore. In the past, re-fracture treatments have attempted to utilize large fluid volumes and rate to 'fill up' the depleted pressure voids in the reservoir. The large volumes and rate are intended to induce a pressure contrast by volumetric input thus minimize leakoff during the re-fracture treatment. The concept is discussed in detail in SPE 25926 "Large volume, high rate stimulation treatments in horizontal wells in the Niobrara Formation, Silo Field, Laramie County, Wyo." The process discussed in this paper utilizes 'wax beads' as self-degrading materials to bridge off the induced fracture pathways and initiate new fractures during the treatment. However, the prime method of leakoff control was inducing pressure with large volumetric input. No attempt was made to bridge off existing fracture or pore spaces to minimize the fluid loss.

Figure 9:
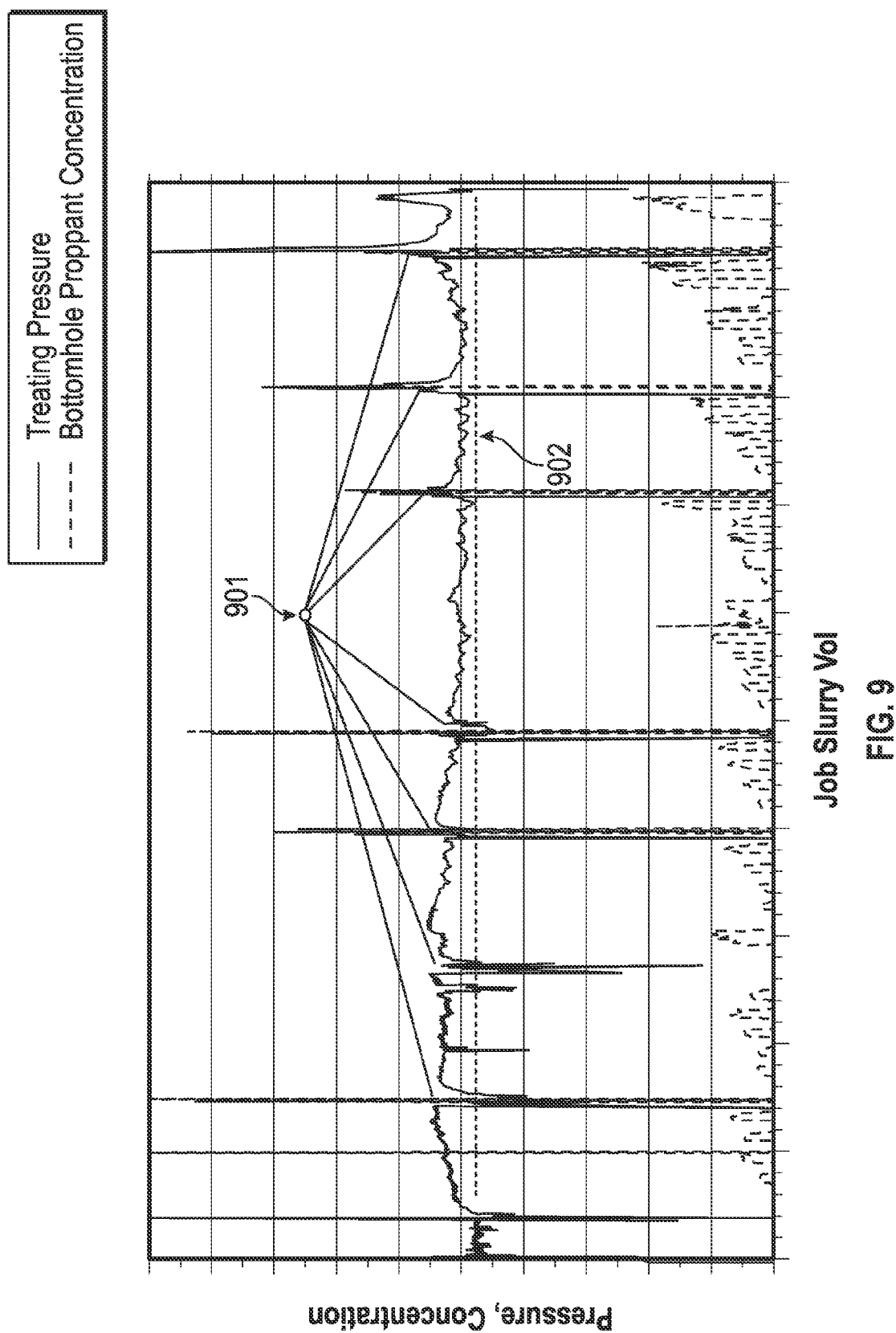
FIG. 9 illustrates the pressure over time during a re-fracture treatment without any leakoff mitigation treatment.

The disclosed process uses self-degrading particles to reduce leakoff with minimal fluid usage prior to performing the re-fracture treatment. In the past, self-degrading materials have previously been used to create diversion during the fracture treatment, typically after a significant volume of fluid and proppant have been injected into the reservoir. FIG. 9 is an illustration of a re-fracture treatment using self-degrading diverters 901 at the reservoir without any leakoff mitigation treatment. Large volume and rates are used in attempt to overcome fluid leakoff. The minimal increase in net pressure 902 during the job may suggest significant leakoff throughout the entire treatment.

Advantages of the invention may include at least one of: improvement of regained conductivity of existing fractures by mitigating leakoff; improved diversion capability of re-fracture treatments to increase the stimulated reservoir volume; reduction in fluid volumes required to re-fracture the reservoir, reduced horsepower requirements of fracture treatment; and combinations thereof.

Carrier Fluids

Carrier fluids may be used to deliver the self-degrading particles into a wellbore. The carrier fluid that is used to deposit the particles in the fractures may be the same fluid that was used in a fracturing operation or may be a second fluid that is introduced into the well after the fracturing fluid is introduced. The carrier fluids may include non-aqueous base fluids, aqueous base fluids, foams, and combinations thereof.

Non-Aqueous Base Fluids

In exemplary embodiments, non-aqueous base fluids may be used in the carrier fluids. Examples of non-aqueous fluids include alcohols such as methanol, ethanol, isopropanol, and other branched and linear alkyl alcohols; diesel; paraffinic solvent; raw crude oils; condensates of raw crude oils; refined hydrocarbons such as naphthalenes, xylenes, toluene and toluene derivatives, hexanes, pentanes; gases such as nitrogen, carbon dioxide, propane, butane, methane, natural gas; and combinations thereof. In certain embodiments, the gases may be used to create commingled foams that make up the non-aqueous base fluids. The fluids may be foamed by combining a compressible gas with the compositions in an amount sufficient to foam the compositions and produce a desired density. Optionally, an effective amount of a foaming agent and an effective amount of a foam stabilizer may be used. In some embodiments, the non-aqueous carrier fluid is present in the treatment fluid the amount of from about 0.1% to about 95% by volume of the treatment fluid, preferably from about 1% to about 90%.

Aqueous Base Fluids

The aqueous base fluid of the present embodiments can generally be from any source, provided that the fluids do not contain components that might adversely affect the stability and/or performance of the treatment fluids of the present invention. The aqueous carrier fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

The aqueous carrier fluid may be present in the treatment fluid in the amount of from about 80% to about 99% by volume of the treatment fluid, typically from about 94% to about 98%.

Particles

As used herein, a "particle" refers a body having a finite mass and sufficient cohesion such that it can be considered as an entity but having relatively small dimensions. As used herein, a particle can be of any size ranging from molecular scale particles to macroscopic particles, depending on context. A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions. Particulates as used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand). A particulate will have a particle size distribution ("PSD"). As used herein, "the size" of a particulate can be determined by methods known to persons skilled in the art.

In some embodiments, the particle diameters of the self-degrading material have a distribution where greater than 10% are smaller than the proppant diameter and greater than 10% are larger than the proppant diameter. In other embodiments, the particle diameters of the self-degrading material have a distribution where about 10% to about 20% are smaller than the proppant diameter and about 10% to about 20% are larger than the proppant diameter. In further embodiments, the particle diameters of the self-degrading material have a distribution where about 20% to about 70% are smaller than the proppant diameter and less than about 5% are larger than the proppant diameter.

Degradable Materials

The choice of degradable material for use in the degradable particulate can depend, at least in part, on the conditions of the well, e.g., wellbore temperature. For instance, lactides can be suitable for lower temperature wells, including those within the range of about 60° F. to about 150° F., and polylactides can be suitable for well bore temperatures above this range. Dehydrated salts may also be suitable for higher temperature wells.

Useful degradable polymers for the matrix of the present invention are considered to be "degradable" herein if the degradation is due to, inter alia, chemical or radical process such as hydrolysis, oxidation, enzymatic degradation, or UV radiation. The degradability of a polymer depends at least in part on its backbone structure. For instance, the presence of hydrolyzable or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Non-limiting examples of degradable materials that may be used in conjunction with the present invention include, but are not limited to phenyl formaldehyde; lactone styrene derivatives; precipitated silica; elastomers; polyvinylidene chloride (PVDC); nylon; waxes; polyurethanes; cross-linked partially hydrolyzed acrylics, aromatic polyesters and aliphatic polyesters. Such polyesters may be linear, graft, branched, crosslinked, block, dendritic, homopolymers, random, block, and star- and hyper-branched aliphatic polyesters, etc. Some suitable polymers include poly(hydroxy alkanoate) (PHA); poly(alpha-hydroxy) acids such as polylactic acid (PLA), polyglcolic acid (PGA), polylactide, and polyglycolide; poly(beta-hydroxy alkanoates) such as poly (beta-hydroxy butyrate) (PHB) and poly(beta-hydroxybutyrates-co-beta-hydroxyvelerate) (PHBV); poly(omega-hydroxy alkanoates) such as poly(beta-propiolactone) (PPL) and poly($\epsilon$-caprolactone) (PCL); poly(alkylene dicarboxylates) such as poly(ethylene succinate) (PES), poly(butylene succinate) (PBS), and poly(butylene succinate-co-butylene adipate); polyanhydrides such as poly(adipic anhydride); poly(orthoesters); polycarbonates such as poly(trimethylene carbonate); and poly(dioxepan-2-one)]; aliphatic polyesters; poly(lactides); poly(glycolides); poly($\epsilon$-caprolactones); poly (hydroxybutyrates); poly(anhydrides); aliphatic polycarbonates; poly(orthoesters); poly(amino acids); poly(ethylene oxides); and polyphosphazenes. Derivatives of the above materials may also be suitable, in particular, derivatives that have added functional groups that may help control degradation rates.

For the purposes of forming a suitable polymer matrix, the polymer (or oligomer) may have at least a sufficient degree of polymerization or level of plasticization to be a solid. Polycondensation reactions, ring-opening polymerizations, free radical polymerizations, anionic polymerizations, carbocationic polymerizations, coordinative ring-opening polymerization, and any other suitable process may prepare such suitable polymers. One of skill in the art will be able to adjust the composition of the polymer to achieve the desired degradation properties.

Formation Treatment

During a remedial or primary treatment, a proppant pack may be formed in a treatment zone before the fracturing stage of the process. A proppant pack may also be formed during the fracturing stage. If the proppant pack is formed before the fracturing stage, the treatment zone was previously fractured and a proppant pack was previously placed in the fracture complexity. Accordingly, the methods according to the invention can be adapted for remedial or primary fracturing of a treatment zone.

Fracturing/Re-Fracturing Process

After blending into a carrier fluid, the self-degrading particles are injected downhole to a desired location in the well. Those skilled in the art of well treatment are familiar with the techniques used for injecting particulates and chemicals into the desired portion of a well. For example, a typical fracturing process first positions a spacer in the pipe string just below the fractured formation. After positioning of the spacer, fracturing fluid is pumped at fracturing rates into the target formation. The spacer acts to initiate the fracture by focusing fluid pressure on the desired formation. The injection of fluid into a formation may leakoff into the matrix of the formation without creating a fracture; however, if the injection rate exceeds the matrix leakoff into the formation a hydraulic fracture will initiate. The desired flow rate at which the self-degrading particles are injected into the formation and/or existing fractures prior to a re-fracture treatment is less than the fracture initiation rate. The desired rate for a re-fracture treatment is greater than the fracture initiation rate, therefore relatively higher than the leakoff mitigation treatment.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, foam stabilizers, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Hydraulic fracturing, sometimes referred to as fracturing or fracing, is a common stimulation treatment. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation. In wells penetrating certain formations, it is often desirable to create relatively small fractures referred to in the art as "microfractures" in the formations near the wellbores to facilitate creation of hydraulically induced enlarged fractures.

The substance of a "gel" is a colloidal dispersion. A gel is formed by a network of interconnected molecules, such as of a crosslinked polymer or of micelles, which at the molecular level are attracted to molecules in liquid form. The network gives a gel phase its structure (apparent yield point) and contributes to stickiness (tack). By weight, the substance of gels is mostly liquid, yet they behave like solids due to the three-dimensional network with the liquid. At the molecular level, a gel is a dispersion in which the network of molecules is continuous and the liquid is discontinuous.

In various embodiments, systems configured for delivering the treatment fluids described herein to a downhole location are described. In various embodiments, the systems can comprise a pump fluidly coupled to a tubular, the tubular containing the hydrolysable acid, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for carrier downhole.

Figure 10:
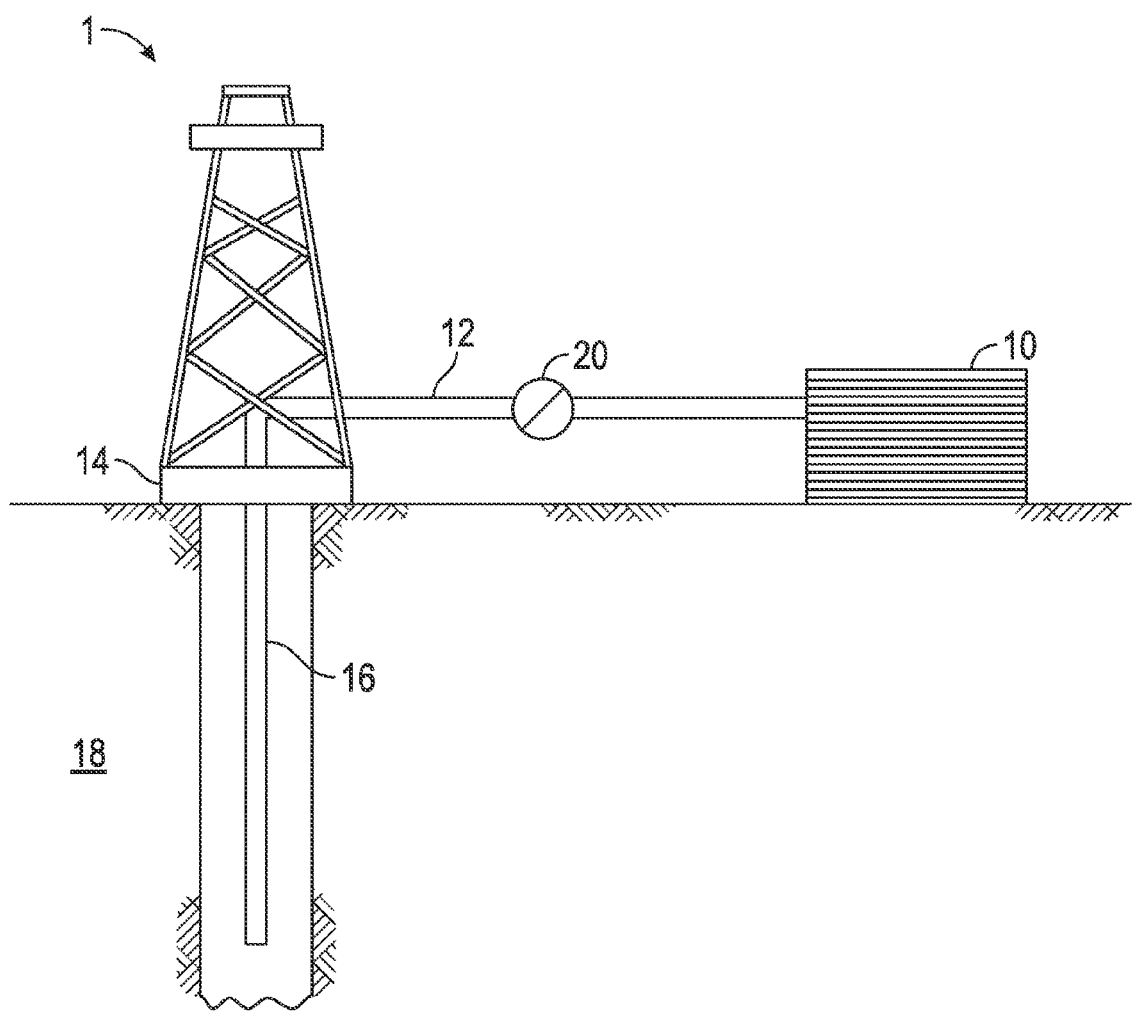
FIG. 10 illustrates an apparatus for delivering the treatment fluids disclosed herein.

FIG. 10 shows an illustrative schematic of a system that can deliver treatment fluids of the embodiments disclosed herein to a downhole location, according to one or more embodiments. It should be noted that while FIG. 10 generally depicts a land-based system, it is to be recognized that like systems may be operated in subsea locations as well. As depicted in FIG. 10, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 10, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 10.

Example

The invention having been generally described, the following example is given as a particular embodiment of the invention and to demonstrate the practice and advantages hereof. It is understood that the example is given by way of illustration and are not intended to limit the specification or the claims to follow in any manner.

Figure 11:
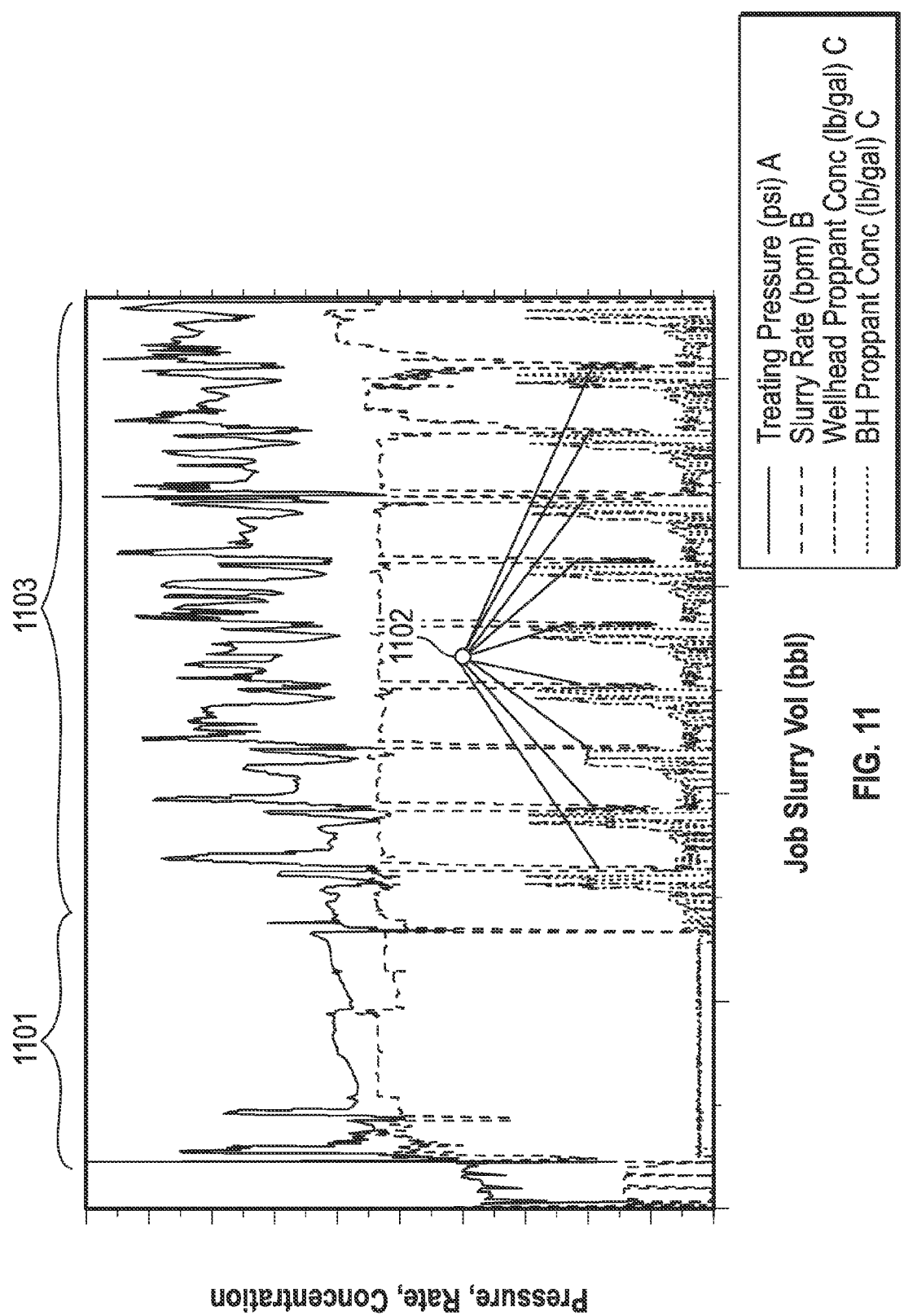
FIG. 11 illustrates the pressure and slurry rate over time during a leakoff mitigation treatment utilizing self-degrading particles followed by re-fracture treatment.

FIG. 11 is an example of a re-fracture treatment utilizing embodiments of the invention. The early time is a low rate injection of self-degrading materials 1101 being displaced into the reservoir prior to the main treatment 1103. The invented process utilizes self-degrading materials 1102 prior to pumping the main proppant schedule. The purpose of pumping diverter materials prior to the main proppant schedule is to control leakoff caused by differential depletion, it also minimizes the invasion of fracturing fluids into the existing productive propped/unpropped fracture network and reservoir.

Embodiments disclosed herein include:

A: A method of treating a wellbore in a subterranean formation comprising: combining self-degrading particles with a carrier fluid; placing the self-degrading particles and the carrier fluid into a fracture of the subterranean formation; allowing the self-degrading materials to penetrate and plug off the connection to existing fractures and to bridge off fracture propagation near the wellbore; and initiating a re-fracture treatment comprising re-fracture fluids and proppant materials prior to the degradation of the self-degrading particles.

B: A method of re-fracturing a wellbore, comprising: placing self-degrading particles and a carrier fluid into the wellbore, wherein the wellbore is in a fractured formation; allowing the self-degrading materials to penetrate and plug off the connection to existing fractures in the formation and to bridge off fracture propagation near the wellbore; and initiating a re-fracture treatment comprising re-fracture fluids and proppant materials prior to the degradation of the self-degrading particles.

C: A method of mitigating leakoff during re-fracturing a wellbore, comprising: placing self-degrading particles and a carrier fluid into the wellbore, wherein the wellbore is in a fractured formation; allowing the self-degrading materials to penetrate and plug off the connection to existing fractures in the formation and to bridge off fracture propagation near the wellbore; and initiating a re-fracture treatment comprising re-fracture fluids and proppant materials prior to the degradation of the self-degrading particles.

D: A well treatment system comprising: a wellbore treatment apparatus, including a mixer and a pump, configured to: combine self-degrading particles with a carrier fluid; place the self-degrading particles and the carrier fluid into a fracture of a subterranean formation; allow the self-degrading materials to penetrate and plug off the connection to existing fractures and to bridge off fracture propagation near the wellbore; and initiate a re-fracture treatment comprising re-fracture fluids and proppant materials prior to the degradation of the self-degrading particles.

Each of embodiments A, B, C and D may have one or more of the following additional elements in any combination: Element 1: wherein at least about 10% of the diameters of the self-degrading particles are smaller than the proppant material diameter, and at least about 10% of the diameters of the self-degrading particles are larger than the proppant material diameter. Element 2: wherein the portion of self-degrading particles smaller than the proppant material penetrates and plugs off the connection to existing fractures. Element 3: wherein the portion of self-degrading particles larger than the proppant material bridges off fracture propagation near the wellbore. Element 4: wherein self-degrading particles are placed into the reservoir at a lower injection rate than the average fracture or re-fracture treatment rate. Element 5: wherein the wellbore comprises a lateral portion with a heel and a toe, and the self-degrading particles in the carrier fluid control the leakoff of re-fracturing fluids into natural and existing propped fractures in the heel of the well. Element 6: wherein the carrier fluid consists of at least one of an aqueous based fluid; non-aqueous based fluid; commingled foam using nitrogen, commingled foam using carbon dioxide; a binary combination of multiple energized fluids, and combinations thereof. Element 7: wherein the self-degrading particles are at least one selected from phenyl formaldehyde; lactone styrene derivatives; precipitated silica; elastomers; polyvinylidene chloride (PVDC); nylon; waxes; polyurethanes; cross-linked partially hydrolyzed acrylics; poly(hydroxy alkanoate) (PHA); poly(alpha-hydroxy) acids; polylactic acid (PLA), polygylcolic acid (PGA), polylactide, polyglycolide; poly(beta-hydroxy alkanoates); poly(beta-hydroxy butyrate) (PHB); poly(beta-hydroxybutyrates-co-beta-hydroxyvelerate) (PHBV); poly(omega-hydroxy alkanoates); poly(beta-propiolactone) (PPL); poly($\epsilon$-caprolactone) (PCL); poly(alkylene dicarboxylates); poly(ethylene succinate) (PES); poly(butylene succinate) (PBS); poly(butylene succinate-co-butylene adipate); polyanhydrides; poly(adipic anhydride); poly(orthoesters); polycarbonates; poly(trimethylene carbonate); poly(dioxepan-2-one)]; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); polyphosphazenes, and combinations thereof. Element 8: wherein excessive leakoff into the existing fracture network occurs due to the localized depletion of pore pressure in the reservoir, and the leakoff is mitigated by creating diversion away from localized depletion of pore pressure by utilizing the self-degrading materials. Element 9: wherein the invasion of re-fracturing fluids into preexisting fractures is minimized, and the regained flow capacity of existing fractures is improved. Element 10: wherein the non-aqueous carrier fluid is present in the treatment fluid the amount of from about 0.1% to about 95% by volume of the treatment fluid. Element 11, wherein the non-aqueous carrier fluid is present in the treatment fluid the amount of from about 1% to about 90%. Element 12: wherein the particle diameters of the self-degrading material have a distribution where about 10% to about 20% are smaller than the proppant material diameter and about 10% to about 20% are larger than the proppant material diameter. Element 13: wherein the particle diameters of the self-degrading material have a distribution where about 20% to about 70% are smaller than the proppant material diameter and less than about 5% are larger than the proppant material diameter. Element 14: wherein the carrier fluid comprises a foam. Element 15: further comprising at least one gas selected from nitrogen, carbon dioxide, propane, butane, methane, natural gas, and combinations thereof. Element 16: wherein the subterranean formation comprises a shale formation.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Numerous other modifications, equivalents, and alternatives, will become apparent to those skilled in the art once the above disclosure is fully appreciated. It is intended that the following claims be interpreted to embrace all such modifications, equivalents, and alternatives where applicable.

The invention claimed is:

1. A method of treating a wellbore in a subterranean formation comprising:
   combining self-degrading particles with a carrier fluid;
   placing the self-degrading particles and the carrier fluid into at least one fracture in a treatment zone in the subterranean formation;
   penetrating and plugging off the connection to existing fractures with the self-degrading particles and bridging off fracture propagation near the wellbore with the self-degrading particles; and
   initiating a re-fracture treatment comprising re-fracture fluids and proppant materials prior to the degradation of the self-degrading particles and after the penetrating and plugging off of the connection to the existing fractures by the self-degrading particles.

2. The method of claim 1, wherein at least about 10% of the diameters of the self-degrading particles are smaller than the proppant material diameter, and at least about 10% of the diameters of the self-degrading particles are larger than the proppant material diameter.

3. The method of claim 2, wherein the portion of self-degrading particles smaller than the proppant material penetrates and plugs off the connection to existing fractures.

4. The method of claim 2, wherein the portion of self-degrading particles larger than the proppant material bridges off fracture propagation near the wellbore.

5. The method of claim 1, wherein the particle diameters of the self-degrading material have a distribution where about 10% to about 20% are smaller than the proppant material diameter and about 10% to about 20% are larger than the proppant material diameter.

6. The method of claim 1, wherein the particle diameters of the self-degrading material have a distribution where about 20% to about 70% are smaller than the proppant material diameter and less than about 5% are larger than the proppant material diameter.

7. The method of claim 4, wherein self-degrading particles are placed into the reservoir, using a floating piston pump or a positive displacement pump, at a lower injection rate than the average fracture or re-fracture treatment rate.

8. The method of claim 1, wherein the wellbore comprises a lateral portion with a heel and a toe, and the self-degrading particles in the carrier fluid control the leakoff of re-fracturing fluids into natural and existing propped fractures in the heel of the well.

9. The method of claim 1, wherein the carrier fluid consists of at least one of an aqueous based fluid; non-aqueous based fluid; commingled foam using nitrogen, commingled foam using carbon dioxide; a binary combination of multiple energized fluids, and combinations thereof.

10. The method of claim 1, wherein the self-degrading particles are at least one selected from phenyl formaldehyde; lactone styrene derivatives; precipitated silica; elastomers; polyvinylidene chloride (PVDC); nylon; waxes; polyurethanes; cross-linked partially hydrolyzed acrylics; poly(hydroxy alkanoate) (PHA); poly(alpha-hydroxy) acids; polylactic acid (PLA), polygylcolic acid (PGA), polylactide, polyglycolide; poly(beta-hydroxy alkanoates); poly(beta-hydroxy butyrate) (PHB); poly(beta-hydroxybutyrates-co-beta-hydroxyvelerate) (PHBV); poly(omega-hydroxy alkanoates); poly(beta-propiolactone) (PPL); poly($\epsilon$-caprolactone) (PCL); poly(alkylene dicarboxylates); poly(ethylene succinate) (PES); poly(butylene succinate) (PBS); poly (butylene succinate-co-butylene adipate); polyanhydrides; poly(adipic anhydride); poly(orthoesters); polycarbonates; poly(trimethylene carbonate); poly(dioxepan-2-one)]; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); polyphosphazenes, and combinations thereof.

11. The method of claim 1, wherein excessive leakoff into the existing fracture network occurs due to the localized depletion of pore pressure in the reservoir, and the leakoff is mitigated by creating diversion away from localized depletion of pore pressure by utilizing the self-degrading materials.

12. The method of claim 1, wherein the invasion of re-fracturing fluids into preexisting fractures is minimized, and the regained flow capacity of existing fractures is improved.

13. The method of claim 1, wherein the carrier fluid comprises a foam.

14. The method of claim 1, wherein the combining, placing, penetrating, plugging, bridging, and initiating all occur before any use of mechanical isolation in the wellbore leading to the treatment zone.

15. The method of claim 1, wherein the combined self-degrading particles and carrier fluid are placed into a non-mechanically isolated wellbore leading to the treatment zone.

16. The method of claim 1, wherein the combining, placing, penetrating, plugging, bridging, and initiating all occur before any use of at least one of tubing string, a packer, and combinations thereof in the wellbore leading to the treatment zone.

17. The method of claim 1, wherein the wellbore consists of a vertical section and a lateral section with a heel and a toe, and at least a portion of the self-degrading particles in the carrier fluid travel through the entire heel and toe of the entire lateral section leading to the treatment zone before initiating the re-fracture treatment.

18. A method of re-fracturing a wellbore, comprising:
placing self-degrading particles and a carrier fluid into the wellbore, wherein the wellbore is in a fractured formation;
penetrating and plugging off the connection to existing fractures with the self-degrading particles and bridging off fracture propagation near the wellbore with the self-degrading particles; and
initiating a re-fracture treatment comprising re-fracture fluids and proppant materials prior to the degradation of the self-degrading particles and after the penetrating and plugging off of the connection to the existing fractures by the self-degrading particles.

19. The method of claim 18, wherein at least about 10% of the diameters of the self-degrading particles are smaller than the proppant material diameter, and at least about 10% of the diameters of the self-degrading particles are larger than the proppant material diameter.

20. The method of claim 19, wherein the portion of self-degrading particles smaller than the proppant material penetrates and plugs off the connection to existing fractures.

21. The method of claim 19, wherein the portion of self-degrading particles larger than the proppant material bridges off fracture propagation near the wellbore.

22. The method of claim 18, wherein the wellbore comprises a lateral portion with a heel and a toe, and the self-degrading particles in the carrier fluid control the leakoff of re-fracturing fluids into natural and existing propped fractures in the heel of the well.

23. The method of claim 18, wherein the self-degrading particles are at least one selected from phenyl formaldehyde; lactone styrene derivatives; precipitated silica; elastomers; polyvinylidene chloride (PVDC); nylon; waxes; polyurethanes; cross-linked partially hydrolyzed acrylics; poly(hydroxy alkanoate) (PHA); poly(alpha-hydroxy) acids; polylactic acid (PLA), polygylcolic acid (PGA), polylactide, polyglycolide; poly(beta-hydroxy alkanoates); poly(beta-hydroxy butyrate) (PHB); poly(beta-hydroxybutyrates-co-beta-hydroxyvelerate) (PHBV); poly(omega-hydroxy alkanoates); poly(beta-propiolactone) (PPL); poly($\epsilon$-caprolactone) (PCL); poly(alkylene dicarboxylates); poly(ethylene succinate) (PES); poly(butylene succinate) (PBS); poly (butylene succinate-co-butylene adipate); polyanhydrides; poly(adipic anhydride); poly(orthoesters); polycarbonates; poly(trimethylene carbonate); poly(dioxepan-2-one)]; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); polyphosphazenes, and combinations thereof.

24. A method of mitigating leakoff during re-fracturing a wellbore, comprising:
placing self-degrading particles and a carrier fluid into the wellbore, wherein the wellbore is in a fractured formation;
penetrating and plugging off the connection to existing fractures with the self-degrading particles and bridging off fracture propagation near the wellbore with the self-degrading particles; and
initiating a re-fracture treatment comprising re-fracture fluids and proppant materials prior to the degradation of the self-degrading particles and after the penetrating and plugging off of the connection to the existing fractures by the self-degrading particles.

25. The method of claim 24, wherein at least about 10% of the diameters of the self-degrading particles are smaller than the proppant material diameter, and at least about 10% of the diameters of the self-degrading particles are larger than the proppant material diameter.

26. The method of claim 25, wherein the portion of self-degrading particles smaller than the proppant material penetrates and plugs off the connection to existing fractures and the portion of self-degrading particles larger than the proppant material bridges off fracture propagation near the wellbore.

27. A well treatment system comprising:
a wellbore treatment apparatus, including a mixer and a pump, configured to:
combine self-degrading particles with a carrier fluid;
place the self-degrading particles and the carrier fluid into at least one fracture of a subterranean formation;
penetrate and plug off the connection to existing fractures with the self-degrading particles and bridge off fracture propagation near the wellbore with the self-degrading particles; and
initiate a re-fracture treatment comprising re-fracture fluids and proppant materials prior to the degradation of the self-degrading particles and after the penetration and plugging off of the connection to the existing fractures by the self-degrading particles.

* * * * *